(12) United States Patent
Kupferberg

(10) Patent No.: US 11,306,935 B2
(45) Date of Patent: Apr. 19, 2022

(54) METHOD AND SYSTEM FOR CONTROLLING AIR FLOW WITHIN A VENTILATION SYSTEM

(71) Applicant: Robert Jeffrey Kupferberg, Hampstead (CA)

(72) Inventor: Robert Jeffrey Kupferberg, Hampstead (CA)

(*) Notice: Subject to any disclaimer, the term of this patent is extended or adjusted under 35 U.S.C. 154(b) by 616 days.

(21) Appl. No.: 15/798,905

(22) Filed: Oct. 31, 2017

(65) Prior Publication Data

US 2019/0128549 A1     May 2, 2019

(51) Int. Cl.
*F24F 11/47*     (2018.01)
*F24F 7/06*     (2006.01)
(Continued)

(52) U.S. Cl.
CPC .............. *F24F 11/47* (2018.01); *F24F 11/39* (2018.01); *F24F 11/49* (2018.01); *F24F 11/75* (2018.01); *B01D 46/0086* (2013.01); *F24F 7/06* (2013.01); *F24F 2110/40* (2018.01); *F24F 2140/10* (2018.01)

(58) Field of Classification Search
CPC ... B01D 46/0086; B01D 46/446; F24F 11/47; F24F 11/39; F24F 7/06; F24F 11/49; F24F 11/75
See application file for complete search history.

(56) References Cited

U.S. PATENT DOCUMENTS 4,491,458 A * 1/1985 Sunter .................. B01D 46/446
                                                                                         55/283
5,711,785 A * 1/1998 Maxwell ............ B01D 46/0068
                                                                                        95/15

(Continued)

FOREIGN PATENT DOCUMENTS

CN        204003656 U    * 12/2014

OTHER PUBLICATIONS

Proper Filter Monitoring, The News, BNP Media, May 22, 2017, downloaded from https://www.achrnews.com/articles/135029-proper-filter-monitoring on May 25, 20 (Year: 2017).*

(Continued)

*Primary Examiner* — Steven S Anderson, III
*Assistant Examiner* — Phillip Decker
(74) *Attorney, Agent, or Firm* — Welsh Flaxman & Gitler LLC

(57) ABSTRACT

A ventilation system includes an input side with a blower, an output side, a filter, and a control system linked to the blower for controlling the output of the blower. The control system also includes a static pressure adjustment system having an input pressure sensor located adjacent the filter on the input side and an output pressure sensor located adjacent the filter on the output side. The static pressure adjustment system also includes a microprocessor linked to the input pressure sensor and the output pressure sensor, the microprocessor receiving signals indicating the static pressure on the input side and the output side. Based upon the static pressure on the input side and output side, the static pressure adjustment system determines a measured differential pressure and continuously sends a signal to increase the output of the blower as the measured pressure differential increases.

5 Claims, 3 Drawing Sheets

(51) Int. Cl.
*F24F 11/75* (2018.01)
*F24F 11/49* (2018.01)
*F24F 11/39* (2018.01)
*B01D 46/00* (2022.01)
*F24F 110/40* (2018.01)
*F24F 140/10* (2018.01)

(56) References Cited

U.S. PATENT DOCUMENTS

| | | | | |
|---|---|---|---|---|
| 5,914,453 | A * | 6/1999 | James | B01D 46/0086 340/577 |
| 6,190,442 | B1 * | 2/2001 | Redner | B01D 46/0086 96/421 |
| 6,790,257 | B2 * | 9/2004 | Jeng | F24F 3/167 95/19 |
| 8,574,343 | B2 * | 11/2013 | Bisson | B01D 46/0086 95/25 |
| 9,092,040 | B2 * | 7/2015 | Fadell | F24F 11/30 |
| 9,366,448 | B2 * | 6/2016 | Dean-Hendricks | F24F 3/1603 |
| 9,702,577 | B1 * | 7/2017 | Lachapelle | F24F 11/30 |
| 10,119,718 | B2 * | 11/2018 | Hoglund | F24F 11/30 |
| 2007/0205297 | A1 | 9/2007 | Finkham et al. | |
| 2010/0288468 | A1 | 11/2010 | Patel et al. | |
| 2012/0125592 | A1 * | 5/2012 | Fadell | F24F 11/30 165/201 |
| 2012/0318073 | A1 | 12/2012 | Zavodny et al. | |
| 2013/0158719 | A1 | 6/2013 | McKie et al. | |
| 2017/0159954 | A1 | 6/2017 | Bergman et al. | |

OTHER PUBLICATIONS

Lindeburg, Mechanical Engineering Reference Manual, Eighth Edition, 1990, Professional Publications, Inc., p. 5-4. (Year: 1990).*

Liu, CN204003657 U English machine translation, Dec. 10, 2014 (Year: 2014).*

* cited by examiner

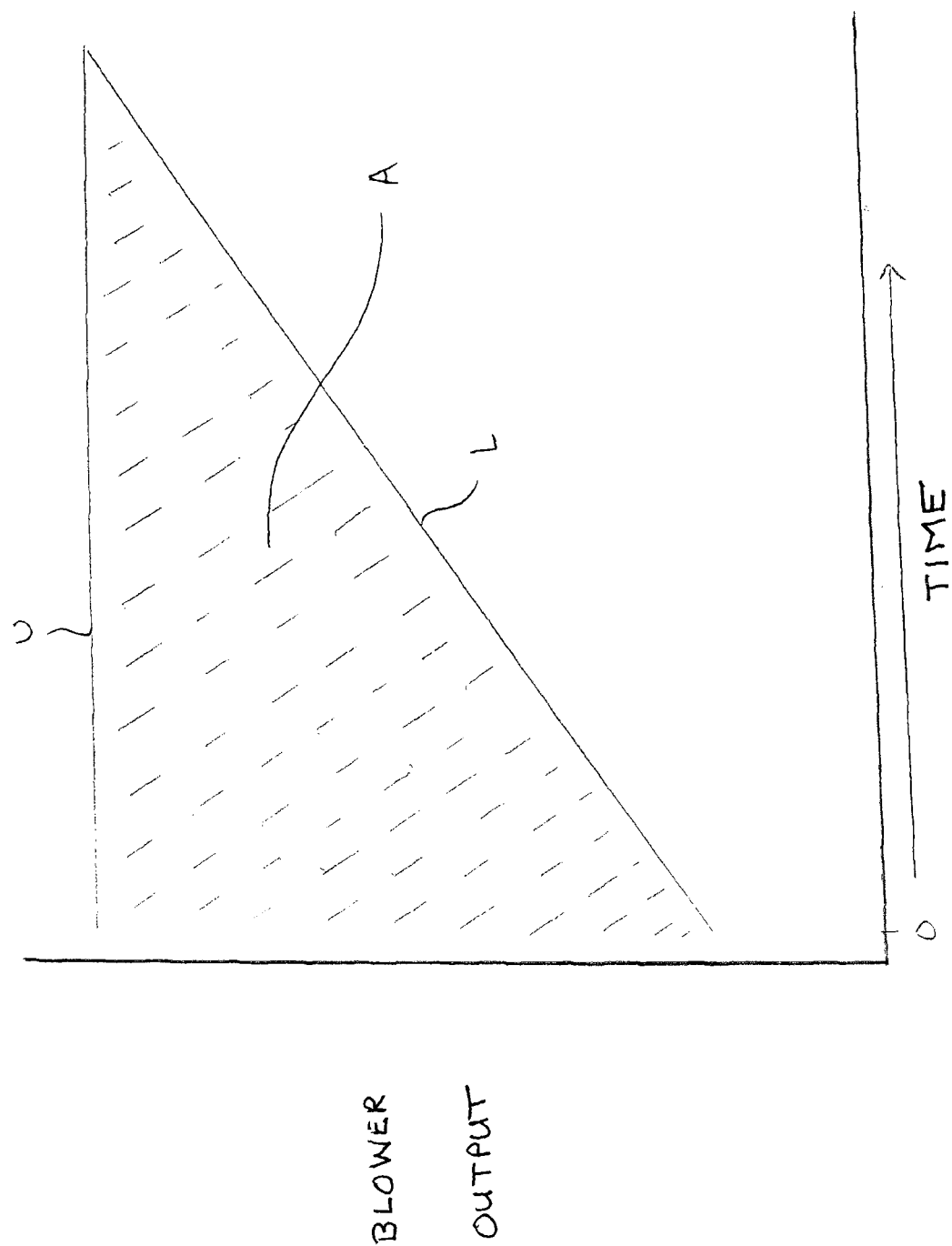

METHOD AND SYSTEM FOR CONTROLLING AIR FLOW WITHIN A VENTILATION SYSTEM

BACKGROUND OF THE INVENTION

1. Field of the Invention

The present invention generally relates to a method and system for controlling air flow within a ventilation system.

2. Description of the Related Art

In order to make certain an adequate flow of air is achieved throughout a ventilation system, engineers calculate the blower output based upon airflow when the filter is fully loaded with contaminants and is ready for replacement. At this point in time, the required airflow is at its peak and use of the ventilation system with a clean filter will result in airflow above and beyond that required in accordance with the operating parameters of the ventilation system. This, however, results in a large waste of energy for the ventilation system during the period of time between the start of the ventilation system with a clean filter and the time at which the filter replaced due to being fully loaded with contaminants.

SUMMARY OF THE INVENTION

It is, therefore, an object of the present invention to provide a ventilation system including an input side with a blower, an output side, a filter positioned between the input side and the output side, and a control system linked to the blower for controlling the output of the blower. The control system also includes a static pressure adjustment system. The static pressure adjustment system includes an input pressure sensor located adjacent the filter on the input side and an output pressure sensor located adjacent the filter on the output side. The static pressure adjustment system also includes a microprocessor linked to the input pressure sensor and the output pressure sensor, the microprocessor receiving signals indicating the static pressure on the input side and the output side. Based upon the static pressure on the input side and output side, the static pressure adjustment system determines a measured differential pressure and the pressure adjustment system continuously sends a signal to increase the output of the blower as the measured pressure differential increases.

It is also an object of the present invention to provide a ventilation system wherein the control system includes a graphical user interface.

It is another object of the present invention to provide a ventilation system wherein the graphical user interface includes an input for an offset in the measured differential pressure.

It is a further object of the present invention to provide a ventilation system wherein the graphical user interface includes an input for a measured differential pressure of a clean filter.

It is also an object of the present invention to provide a ventilation system wherein the graphical user interface includes an input for turning the static pressure adjustment system on or off.

It is also an object of the present invention to provide a ventilation system wherein the static pressure adjustment system includes an alarm.

It is further an object of the present invention to provide a method for adjusting air flow from a blower in a ventilation system to compensate for changes in static pressure across a filter. The method includes determining a measured differential pressure between an input side of a ventilation system and an output side of the ventilation system, wherein a filter is positioned between the input side and the output side. The measured differential pressure is continually measured as the filter fills with contaminants and the output of the blower is continuously increased as the measured differential pressure increases.

It is also an object of the present invention to provide a method wherein the ventilation system includes an inlet pressure sensor on the inlet side and an outlet pressure sensor on the outlet side.

It is another object of the present invention to provide a method wherein the step of determining the measured differential pressure includes determining a measured differential pressure between the input side and the output side with a clean filter therebetween.

It is further an object of the present invention to provide a method including a graphical user interface.

It is also an object of the present invention to provide a method further including, prior to the step of continually measuring the differential pressure, measuring a pressure difference across the filter when the blower is off and no air flow is passing through the ventilation system.

It is another object of the present invention to provide a method including the step of issuing an alarm when the measured differential pressure reaches a predetermined level.

It is further an object of the present invention to provide a method wherein the predetermined level is an indication that the filter needs to be replaced.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a graph comparing the required output of a blower when the engineer designing and/or maintaining a ventilation system bases his/her calculations for the change in static pressure across a filter upon the worst case scenario of a dirty filter so as to ensure proper air flow through the ventilation system and the actual required output of the blower when the engineer designing and/or maintaining a ventilation system utilizes the present static pressure adjustment system to control the output of the blower in real-time based upon the measured conditions of the filter.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
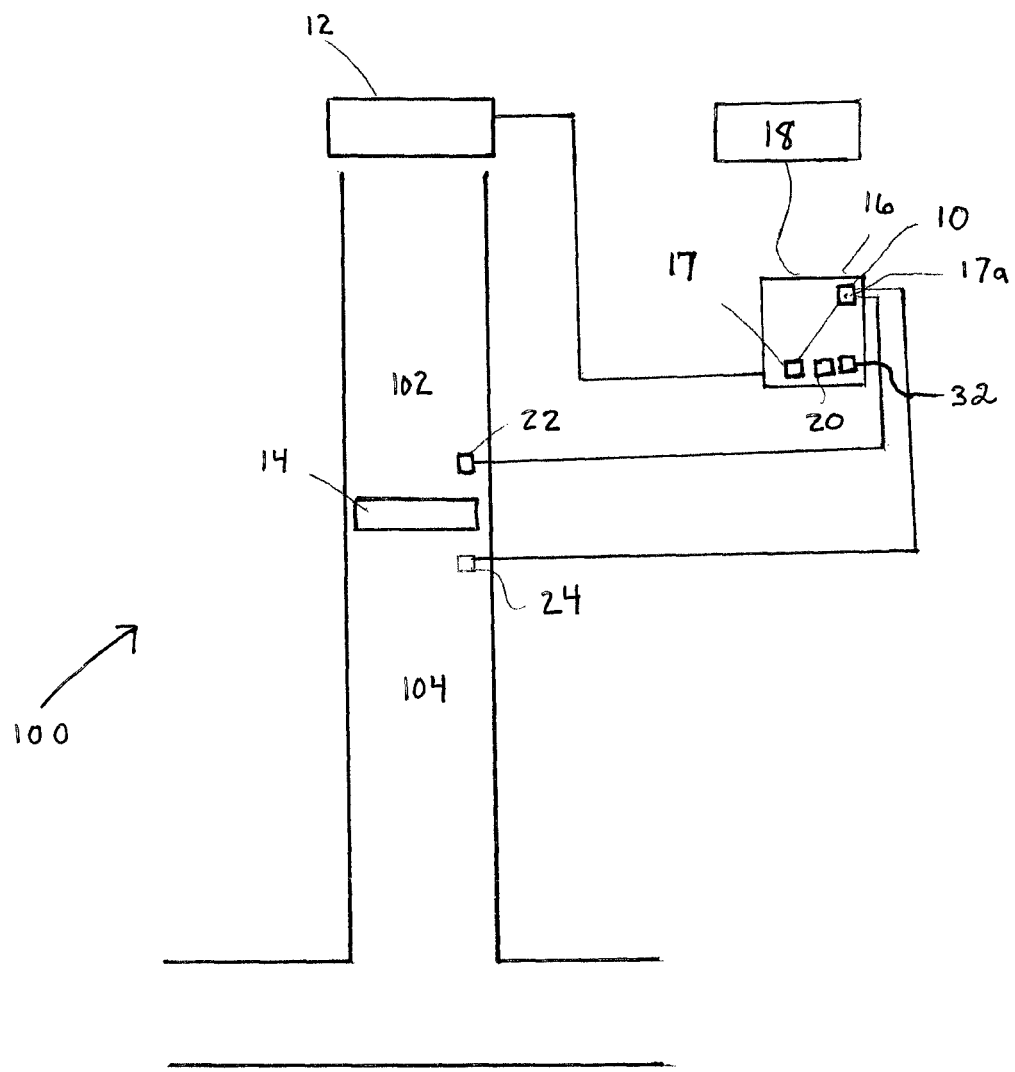
FIG. 1 is a schematic representation of a ventilation system including the present static pressure adjustment system.
Figure 2:
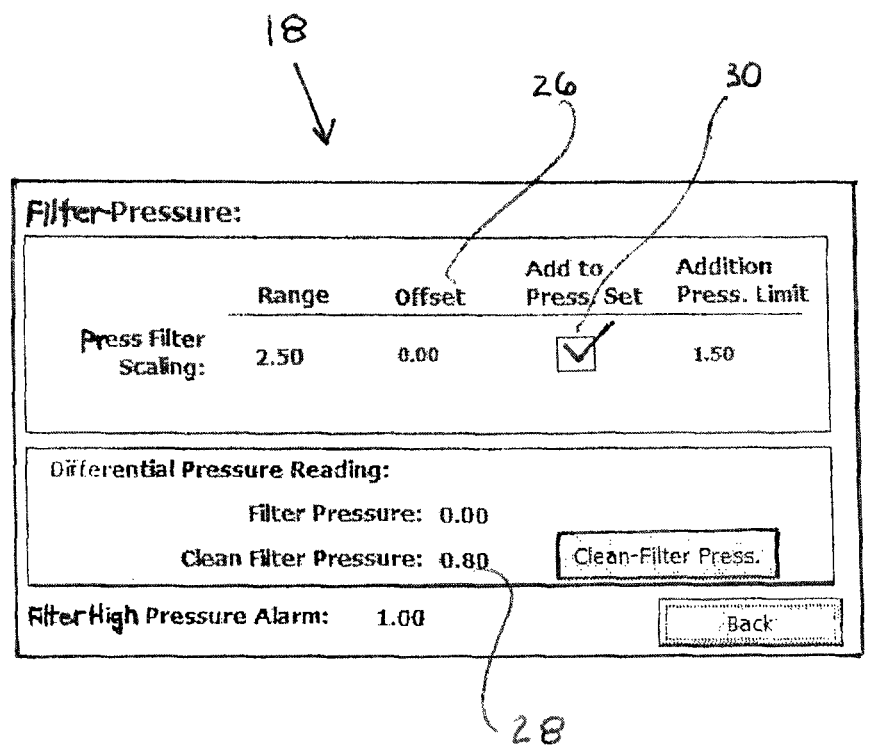
FIG. 2 is a graphical user interface employed in accordance with the static pressure adjustment system of the present invention.

Referring to FIGS. 1 to 3, a static pressure adjustment system 10 and a method for adjusting air flow from a blower 12 in a ventilation system 100 to compensate in real-time for changes in static pressure across a filter 14 due to changes in the cleanliness and efficiency of the filter 14 is disclosed. The present static pressure adjustment system 10 is adapted for utilization in conjunction with a variety of ventilation systems 100. The sole requirement is that the ventilation system 100 must be sufficiently sophisticated to allow for integration of the present static pressure adjustment system 10 into the control system 16 of the ventilation system 100. By employing the present static pressure adjustment system 10, it is not necessary for an engineer designing and/or maintaining a ventilation system 100 to base his/her calculations for the change in static pressure across a filter upon the worst case scenario of a dirty filter so as to ensure proper air flow through the ventilation system 100. Rather, the real-time changes in static pressure across a filter 14 are used in conjunction with real-time calculated adjustments in the output of the blower 12, or a plurality of blowers, to ensure that proper airflow is maintained throughout the ventilation system 100. The ability to make real-time calculated adjustments in the output of the blower 12, or a plurality of blowers, results in significant savings as the blower(s) does not need to be run at a continuously high level or maximum speed to ensure that a minimally high level of air flow is maintained in the ventilation system 100.

With reference to FIG. 3, a substantial savings in the energy required to power the ventilation system 100 and therefore the cost of the energy to run the ventilation system 100 is achieved through implementation of the present static pressure adjustment system 10. The upper horizontal line U in the graph represents the required output of the blower 12 when the engineer designing and/or maintaining a ventilation system 100 bases his/her calculations for the change in static pressure across a filter 14 upon the worst case scenario of a dirty filter so as to ensure proper air flow through the ventilation system 100. In contrast, the lower angled line L in the graph represents the actual required output of the blower 12 when the engineer designing and/or maintaining a ventilation system 100 utilizes the present static pressure adjustment system 10 to control the output of the blower 12 in real-time based upon the measured conditions of the filter 14. The area A between the upper horizontal line U and the lower angled line L represents the savings achieved in reduced energy consumption due to the need to only power the blower to a level sufficient to produce a desired air flow based upon the measured static pressure across the filter when the present static pressure adjustment system 10 is utilized.

In accordance with the present static pressure adjustment system 10, the ventilation system 100 includes an input side 102 on which the blower 12 is positioned and an output side 104. The blower 12 is connected to the control system 16 which continuously controls operation of the blower 12, that is, the control system 16 continuously controls the output of the blower 12 such that the ventilation system 100 provides an adequate air flow for the building into which it is integrated. As such, and considering control of the output of the blower 12 is critical to implementation of the present static pressure adjustment system 10, the control system 16 is considered to be part of the present static pressure adjustment system 10. The control 16 includes a microprocessor 17 controlling operation thereof, a graphical user interface 18, and an output control module 20. As the control logic underlying the present static pressure adjustment system 10 is applied via the control system 16, the control logic underlying the static pressure adjustment system 10 may be integrated (that is, programmed) into the microprocessor 17 of the control system 16 or control logic underlying the static pressure adjustment system 10 may be programmed into its own microprocessor 17a that is linked to the microprocessor 17 for coordinating control of the operation of the ventilation system 100 in accordance with the present invention.

Between the blower/input side 102 of the ventilation system 100 and the output side 104 of the ventilation system 100 is positioned the filter 14. As with the ability to adapt the present static pressure adjustment system 10 for use in conjunction with a variety of ventilation systems 100, the present static pressure adjustment system 10 works in conjunction with various filter types and is in fact independent of the filter type being used.

In addition to the computer logic integrated into either the microprocessor 17 or the static pressure adjustment system microprocessor 17a, the static pressure adjustment system 10 includes pressure sensors 22, 24 that are positioned on the blower/input side 102 of the ventilation system 100 and the output side 104 of the ventilation system 100. The input side sensor 22 and the output side sensor 24 measure the static pressure on their respective sides of the filter 14 and the differential between the static pressure on the input side 102 and the static pressure on the output side 104 is determined, that is, the measured pressure differential is determined. The pressure sensors 22, 24 are electrically linked to the control system 16, in particular, either the microprocessor 17 or the static pressure adjustment system microprocessor 17a implementing the methodology required in accordance with the claimed invention, for controlling air flow within the ventilation system 100 in accordance with the implementation of the present invention. In accordance with a preferred embodiment, the pressure sensors 22, 24 employ a 4-20 mA analog input as a signal for respectively indicating the static pressure on the input side 102 of ventilation system 100 on one side of the filter 14 and the output side 104 of the filter 14 of the ventilation system 100 on the other side of the ventilation system 100. As will be explained below in greater detail, the measured static pressures on the input side 102 and the output side 104 are used to calculate the change in static pressure (that is, the measured differential pressure) across the filter. Where a pressure difference across a filter 14 is calculated when the blower 12 is off, an offset may be established to zero the pressure reading; that is, where residual pressure differences exist in the ventilation system that are unrelated to the blower and/or the filter, it is necessary to take this into account so as to ensure the accuracy of measurements during the implementation of the present system. Still further, if a calibrated pressure displays a different reading, it is desirable to modify the range in small increments to balance the ventilation system 100.

As such, and in accordance with the present invention, the blower 12 output needed to create air flow required for use in conjunction with a clean filter 14 is first established using a conventional HVAC blower linked to the control system 16 employed in accordance with the present invention. The change in static pressure across the clean filter 14 is continuously measured and displayed via the graphical user interface 18 of the control system 16. This is input as the clean measured differential pressure. As will be explained below in greater detail, as the measured differential pressure increases as a result of the filter 14 filling with contaminants, the blower 12 output is continuously increased in real-time based upon the measured differential pressure so as to compensate for the increased resistance to air flow and to ensure that adequate air flow is achieved through the building.

Prior to implementation of the present static pressure adjustment system 10, and in conjunction with establishing the clean measured differential pressure, the pressure difference across a clean filter 14 is measured when the blower 12 is off and no air flow is passing through the ventilation system 100. This pressure difference is established as the pressure offset, and is either added or subtracted from the clean measured differential pressure determined with a clean filter 14 so as to zero the overall ventilation system 100.

The ventilation system 100 is then turned on under the control of the control system 16, in particular, the blower 12 is turned on, and operated in accordance with standard usage so as to create a desired airflow. During usage, the change in the measured differential pressure across the filter 14 is continually measured. As the measured differential pressure across the filter 14 increases above the clean measured differential pressure for the clean filter 14, a delta static pressure measurement is established and continuously updated. The delta static pressure measurement is correlated with a requirement for increased air flow from the blower 12 to ensure continued proper air flow through the ventilation system 100, and the blower 12 of the ventilation system 100 therefore increases its output in a predetermined manner in conjunction with the calculate increases in the delta static pressure measurement. As those skilled in the art will appreciate, static pressure increases with an increase in the blower speed. In fact, static pressure increases at a rate equal to the square of the blower speed increase. As such, a doubling of the blower speed will result in a quadrupling of the static pressure. Considering this fact further, energy consumption increases at a rate equal to the cube of the blower speed increase.

While the control system 16 operates automatically and continuously to increase the output of the blower 12 in real-time, ultimate control of the control system 16 and the parameters under which it is operating, is achieved via the graphical user interface 18 of the control system 16. As FIG. 2 shows, the graphical user interface 18 includes inputs for the offset 26 and the clean filter pressure 28. In addition, the graphical user interface 18 includes an input for either turning the present adjustment mechanism on or off 30. In particular, the box below "Add to Press. Set" is either clicked upon to show the check in which case the present adjustment mechanism is turned on or it is clicked upon to remove the check in which case the present adjustment mechanism is turned off. Still further, the control system 16 allows one to set a limit on the additional pressure that may be applied so as to ensure that the blow is not overworked. This allows the operator to establish an alarm 32 when the delta static pressure measurement, that is, the filter pressure, reaches a specific level (at which point in time the filter 14 must be removed and replaced with a clean filter 14). Once the filter 14 is replaced with a clean filter 14, the delta static pressure measurement should return to approximately zero (accounting for slight differences that might exist between the original filter 14 and the replacement filter 14). Where the replacement filter 14 is materially different from the original filter 14, it may be desirable to repeating the initial steps of establishing the measured differential pressure across the filter 14 and the inherent pressure difference between the input side 102 and the output side 104 when the blower 12 is off.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A ventilation system, comprising:
an input side of the ventilation system with a blower positioned at the input side of the ventilation system;
an output side of the ventilation system;
a filter having an input side and an output side, positioned after the blower between the input side of the ventilation system and the output side of the ventilation system;
a control system linked to the blower for controlling the output of the blower, the control system also including a continuously updating static pressure adjustment system, the continuously updated static pressure adjustment system including:
an input static pressure sensor located adjacent the filter on the input side of the ventilation system and an output static pressure sensor located adjacent the filter on the output side of the ventilation system;
a microprocessor linked to the input static pressure sensor and the output static pressure sensor, the microprocessor receives signals indicating the static pressure on the input side of the filter and the static pressure on the output side of the filter, and based upon a measurement of the static pressure on the input side of the filter and the static pressure on the output side of the filter, the continuously updated static pressure adjustment system determines a continuously measured differential pressure and the pressure adjustment system then continuously sends a signal to increase the output of the blower, located at the input side of flow to the filter, as the continuously measured pressure differential increases, whereas as the continuously measured differential pressure across the filter increases above a clean measured differential pressure for a clean filter, a measured static pressure measurement across the filter is then established and continuously updated and the continuously measured static pressure measurement across the filter is correlated with a requirement for an increased air flow from the blower to ensure continued proper air flow through the filter, and the blower of the ventilation system located at the input side of the ventilation system increases its output in a predetermined manner in conjunction with calculated increases in the continuously measured static pressure measurement across the filter and wherein the blower speed increases in relation to a square root of the increase of the continuously measured static pressure across the filter, and when the measured static pressure measurement across the filter reaches a specific level, when the filter no longer enables the continued proper air flow, the filter must be removed and an alarm is triggered activating a signal that indicates that the filter must be replaced with a clean filter.

2. The ventilation system according to claim 1, wherein the control system includes a graphical user interface.

3. The ventilation system according to claim 2, wherein the graphical user interface includes an input for an offset in the continuously measured differential pressure.

4. The ventilation system according to claim 2, wherein the graphical user interface includes an input for a continuously measured differential pressure of a clean filter.

5. The ventilation system according to claim 2, wherein the graphical user interface includes an input for turning the static pressure adjustment system on or off.

\* \* \* \* \*